United States Patent
Tsai et al.

(10) Patent No.: US 10,031,592 B2
(45) Date of Patent: Jul. 24, 2018

(54) CONTEXTUAL KNOBS FOR IN-VEHICLE SYSTEM CONTROL

(71) Applicant: Toyota Motor Sales, U.S.A., Inc., Torrance, CA (US)

(72) Inventors: David Tsai, Irvine, CA (US); Steve Basra, Frisco, TX (US); John McLaughlin, Huntington Beach, CA (US); Shady Shahid, Piedmont, CA (US); Greg McNamara, San Francisco, CA (US); Per Selvaag, Berkeley, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 37 days.

(21) Appl. No.: 15/194,763

(22) Filed: Jun. 28, 2016

(65) Prior Publication Data
US 2017/0371429 A1    Dec. 28, 2017

(51) Int. Cl.
| | |
|---|---|
| *G06F 3/0362* | (2013.01) |
| *G06F 3/0488* | (2013.01) |
| *G06F 3/0482* | (2013.01) |
| *G06F 3/0484* | (2013.01) |
| *B60K 37/06* | (2006.01) |

(52) U.S. Cl.
CPC .......... *G06F 3/0362* (2013.01); *B60K 37/06* (2013.01); *G06F 3/0482* (2013.01); *G06F 3/0488* (2013.01); *G06F 3/04842* (2013.01); *B60K 2350/104* (2013.01); *B60K 2350/2004* (2013.01)

(58) Field of Classification Search
CPC .................................. G06F 3/044; G06F 3/041
See application file for complete search history.

(56) References Cited

U.S. PATENT DOCUMENTS

| | | | | |
|---|---|---|---|---|
| 6,154,201 A | * | 11/2000 | Levin | G01C 21/3664 345/156 |
| 2002/0148317 A1 | * | 10/2002 | Onodera | G05G 9/047 74/471 XY |
| 2005/0001838 A1 | * | 1/2005 | Gregorio | G06F 3/0482 345/440 |
| 2007/0063995 A1 | | 3/2007 | Bailey et al. | |
| 2011/0037725 A1 | * | 2/2011 | Pryor | G01C 21/3664 345/174 |
| 2012/0125559 A1 | * | 5/2012 | Fadell | F24F 11/0012 165/11.2 |
| 2012/0130547 A1 | * | 5/2012 | Fadell | F24F 11/30 700/276 |
| 2013/0099011 A1 | * | 4/2013 | Matsuoka | G05D 23/1904 236/1 C |
| 2015/0233595 A1 | * | 8/2015 | Fadell | F24F 11/30 700/278 |

OTHER PUBLICATIONS

Smith et al., "Are We There Yet? Thoughts on In-Car HMI", Five Part Blog, Jul. 2014, Version 1.0, 90 pages.

* cited by examiner

*Primary Examiner* — Olga Merkoulova
(74) *Attorney, Agent, or Firm* — Christopher G. Darrow; Darrow Mustafa PC

(57) ABSTRACT

Described herein is a control console. The control console may have a first contextual knob configured to control a first system, a display encompassing the first contextual knob, and a control module configured to update a first portion of the display responsive to detecting a first input. The first portion of the display may be adjacent to the first contextual knob.

20 Claims, 5 Drawing Sheets

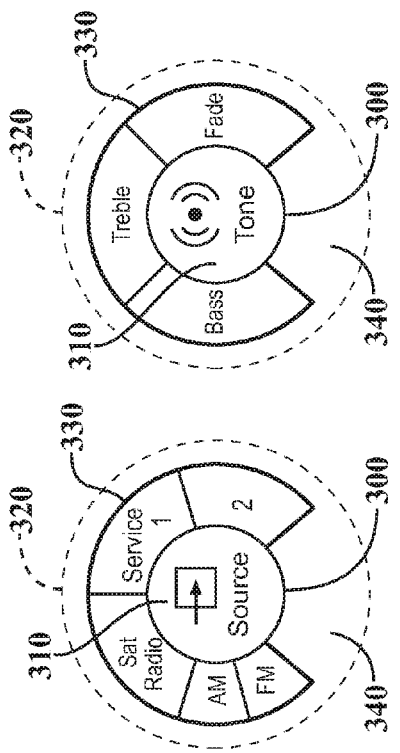 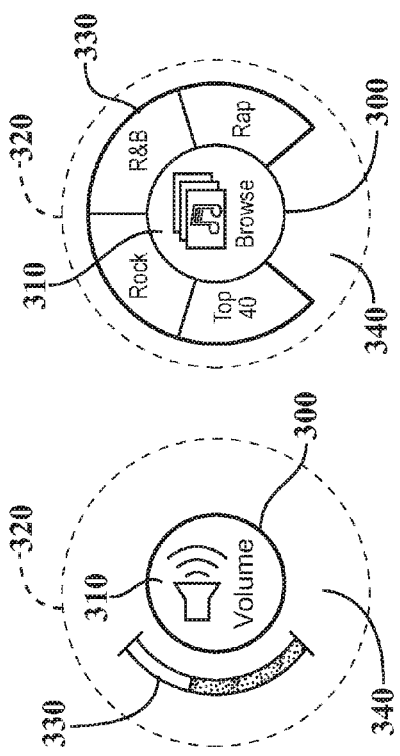 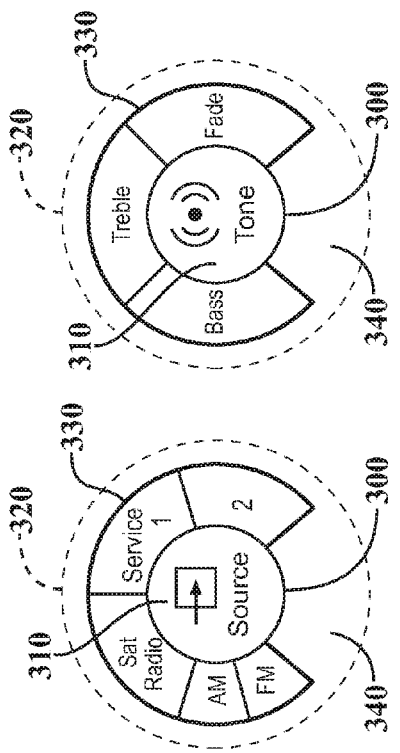 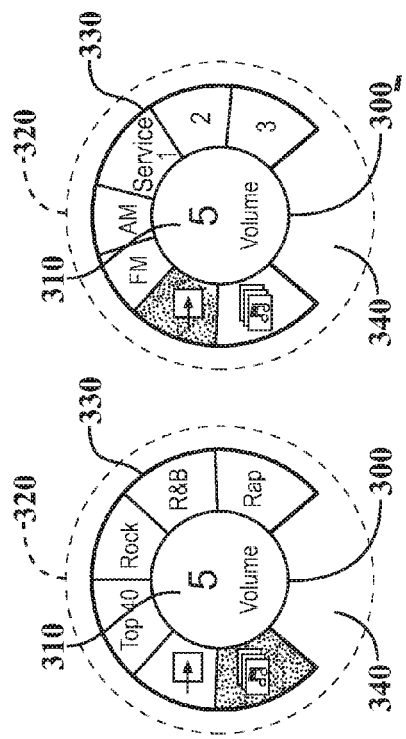 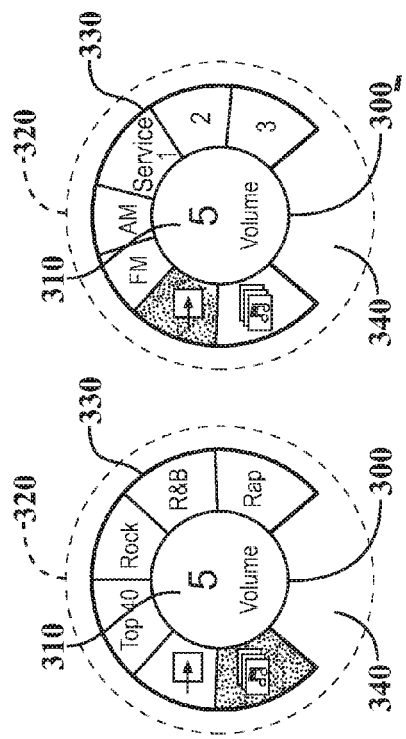 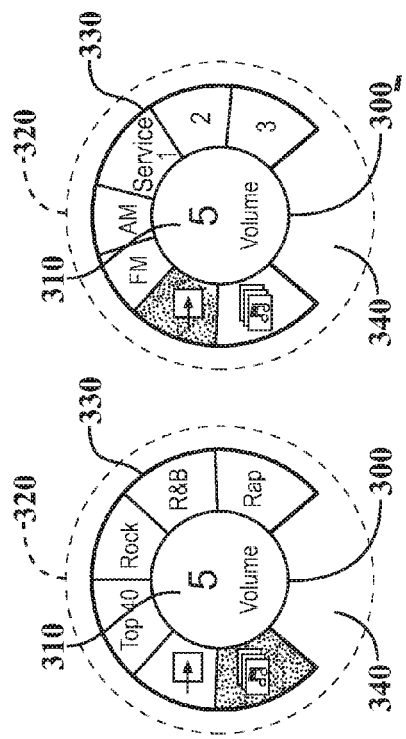 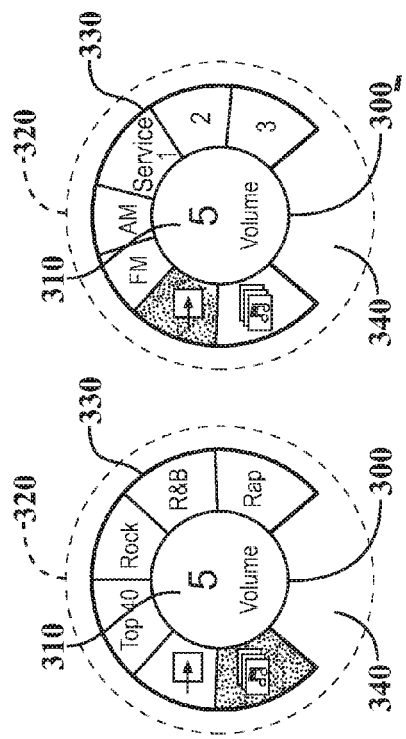 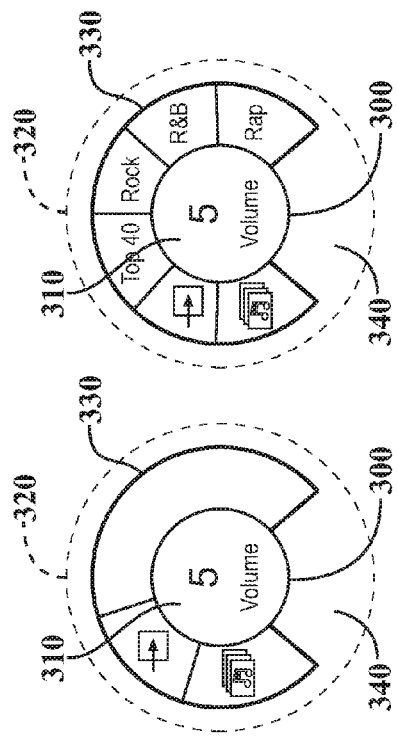
FIG. 3A  FIG. 3B  FIG. 3C  FIG. 3D
FIG. 3E  FIG. 3F  FIG. 3G  FIG. 3H

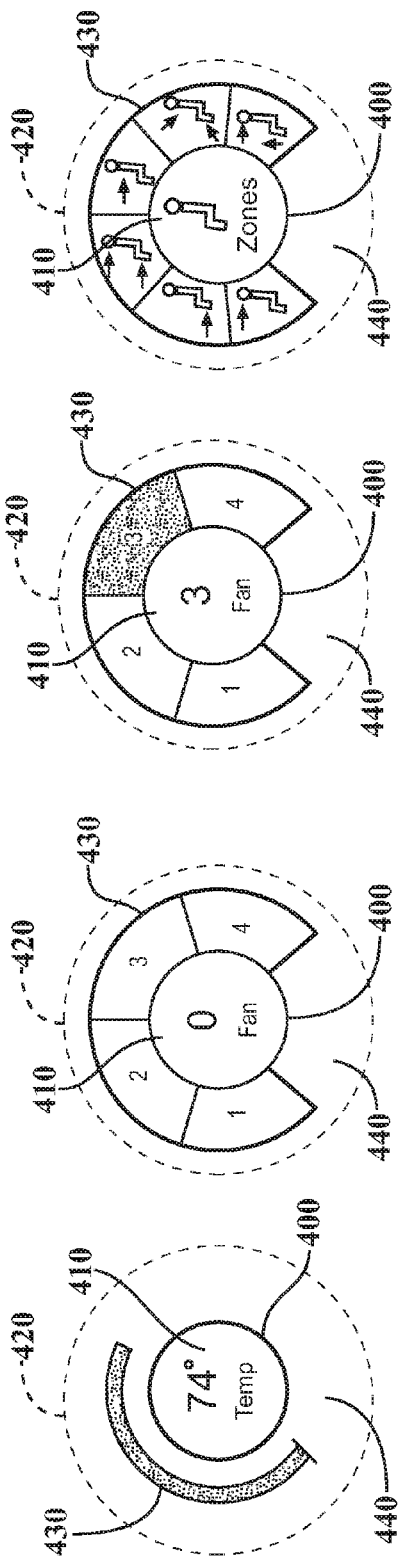
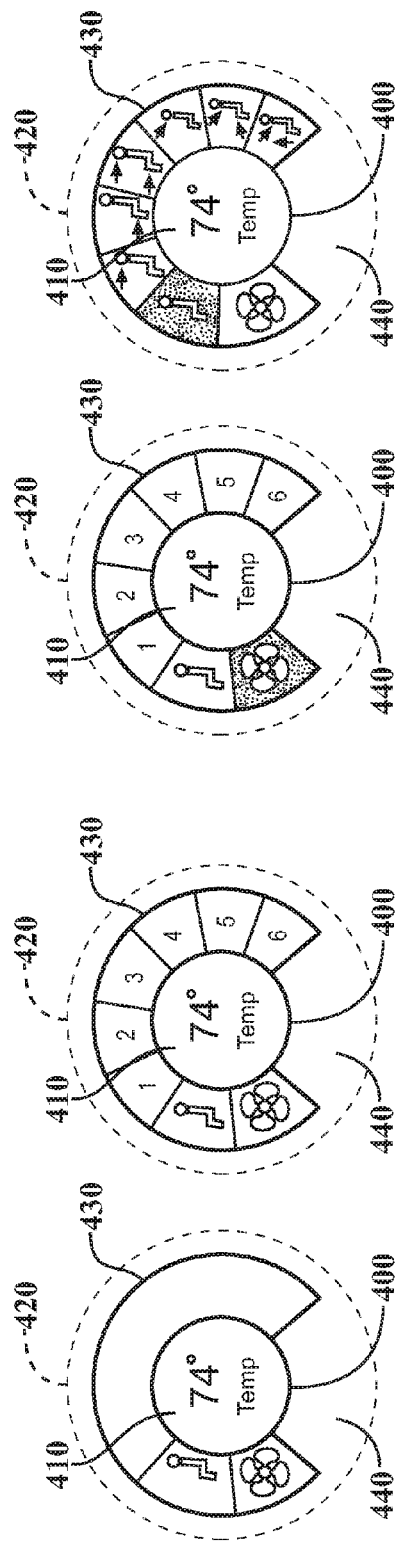

CONTEXTUAL KNOBS FOR IN-VEHICLE SYSTEM CONTROL

TECHNICAL FIELD

The subject matter described herein relates in general to control interfaces, and more particularly, to in-vehicle control knobs.

BACKGROUND

Vehicles have many systems that may be controlled by users of the vehicle. Most vehicles are equipped with climate control systems, audio systems, and other systems that a user may control. Climate control systems have knobs or buttons that are specifically configured to control the climate control system. Audio systems have knobs or buttons that are specifically configured to control the audio system. There are usually several knobs to control desired temperature, fan speed, and climate control zones. There are also usually several knobs for volume, tuning, and source selection. Some cars have touch screen interfaces. The touch screen interface is usually used in place of a knob or separately from a knob. Too many knobs is costly and may be confusing to users of the controls. Touchscreens without knobs may be difficult for a user to see or work with.

SUMMARY

In an embodiment herein, a control console is described. The control console comprises a first contextual knob configured to control a first system; a display encompassing the first contextual knob; and a control module configured to update a first portion of the display responsive to detecting a first input, the first portion adjacent to the first contextual knob.

In another embodiment herein, a method for console control is described. The method comprises detecting, by a control module, a first input; and updating a first portion of a display responsive to detecting the first input, the display encompassing a first contextual knob, the first contextual knob configured to control a first system, and the first portion adjacent to the first contextual knob.

In another embodiment herein, a method for console control is described. The method comprises detecting a first input; displaying controls for a system at a portion of a display responsive to detecting the first input; detecting a second input; and displaying a submenu of the controls at the portion responsive to detecting the second input, the display encompassing a contextual knob, and the portion adjacent to the contextual knob.

BRIEF DESCRIPTION OF THE DRAWINGS

FIG. 3A is a diagram of an embodiment of a contextual knob configured for audio system volume control.

FIG. 3B is a diagram of an embodiment of a contextual knob configured for audio system library browsing control.

FIG. 3C is a diagram of an embodiment of a contextual knob configured for audio source control.

FIG. 3D is a diagram of an embodiment of a contextual knob configured for audio tone control.

FIG. 3E is a first diagram of an embodiment of a contextual knob configured for audio system control.

FIG. 3F is a second diagram of an embodiment of a contextual knob configured for audio system control.

FIG. 3G is a third diagram of an embodiment of a contextual knob configured for audio system control.

FIG. 3H is a fourth diagram of an embodiment of a contextual knob configured for audio system control.

FIG. 4A is a diagram of an embodiment of a contextual knob configured for temperature control.

FIG. 4B is a diagram of an embodiment of a contextual knob configured for fan control.

FIG. 4C is a diagram of an embodiment of a contextual knob and information after a user has touched a desired fan speed.

FIG. 4D is a diagram of an embodiment of a contextual knob configured for zone control.

FIG. 4E is a first diagram of an embodiment of a contextual knob configured for climate control.

FIG. 4F is a second diagram of an embodiment of a contextual knob configured for climate control.

FIG. 4G is a third diagram of an embodiment of a contextual knob configured for climate control.

FIG. 4H is a fourth diagram of an embodiment of a contextual knob configured for climate control.

DETAILED DESCRIPTION

Embodiments described herein provide contextual knobs for controlling in-vehicle systems. A contextual knob may be a knob that can be rotated or depressed. The knob may have an integrated display on a face of the knob. The knob may be surrounded by a display. The display surrounding the knob may change depending on the current use of the knob. The integrated display and the display surrounding the contextual knob may be touch screen interfaces. Any surface (e.g., the face or sides) of the knob may be configured to sense touch.

Figure 1:
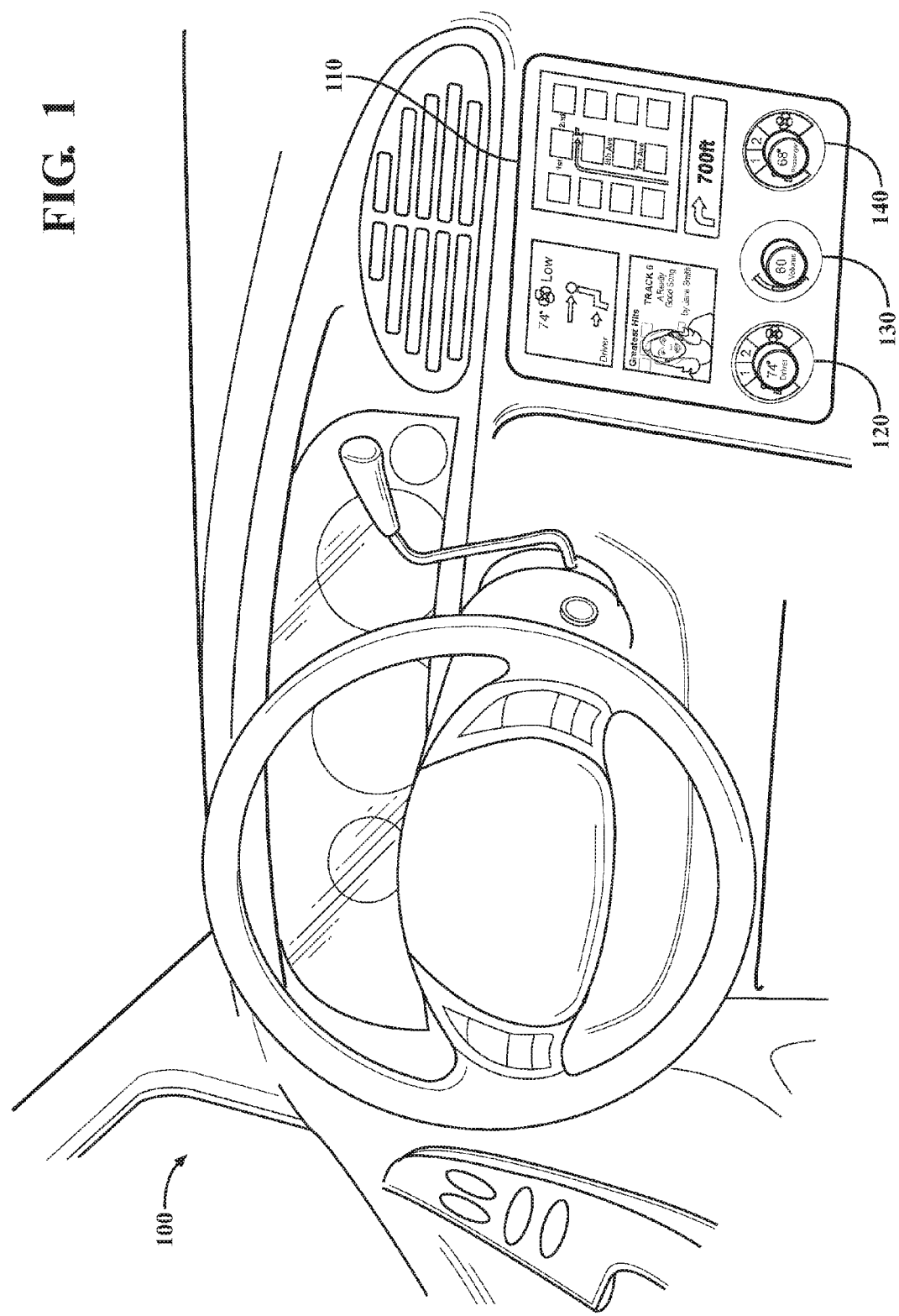
FIG. 1 is a diagram of an embodiment of a vehicle interior comprising contextual knobs.

FIG. 1 is a diagram of an embodiment of a vehicle interior 100 comprising contextual knobs. The vehicle interior 100 comprises a touch screen interface 110, a left contextual knob 120, a center contextual knob 130, and a right contextual knob 140. Touch screen interface 100 may be a capacitive touch screen, a resistive touch screen, or some other type of display capable of receiving an input by touching the display. Touches may be received using one or more fingers, a stylus, or some other surface that touches touch screen interface 110. Touch screen interface 110 may be full color, monochrome, or some other display scheme.

Left contextual knob 120, center contextual knob 130, and right contextual knob 140 may each be a physical control knob. Left contextual knob 120, center contextual knob 130, and right contextual knob 140 may receive input from a user in one or more ways, for example, the knobs may be configured to receive a push input (e.g., depressing), or a rotational input (e.g., turning), or both. In some embodiments, the surfaces of the knobs may be configured to detect touch. Left contextual knob 120, center contextual knob 130, and right contextual knob 140 may each comprise an integrated display on the front of the knob for displaying information or other images on the front of the knob. In some embodiments, the integrated display may also be configured as a touchscreen display. In some embodiments, more or less than three knobs may be present.

Figure 2:
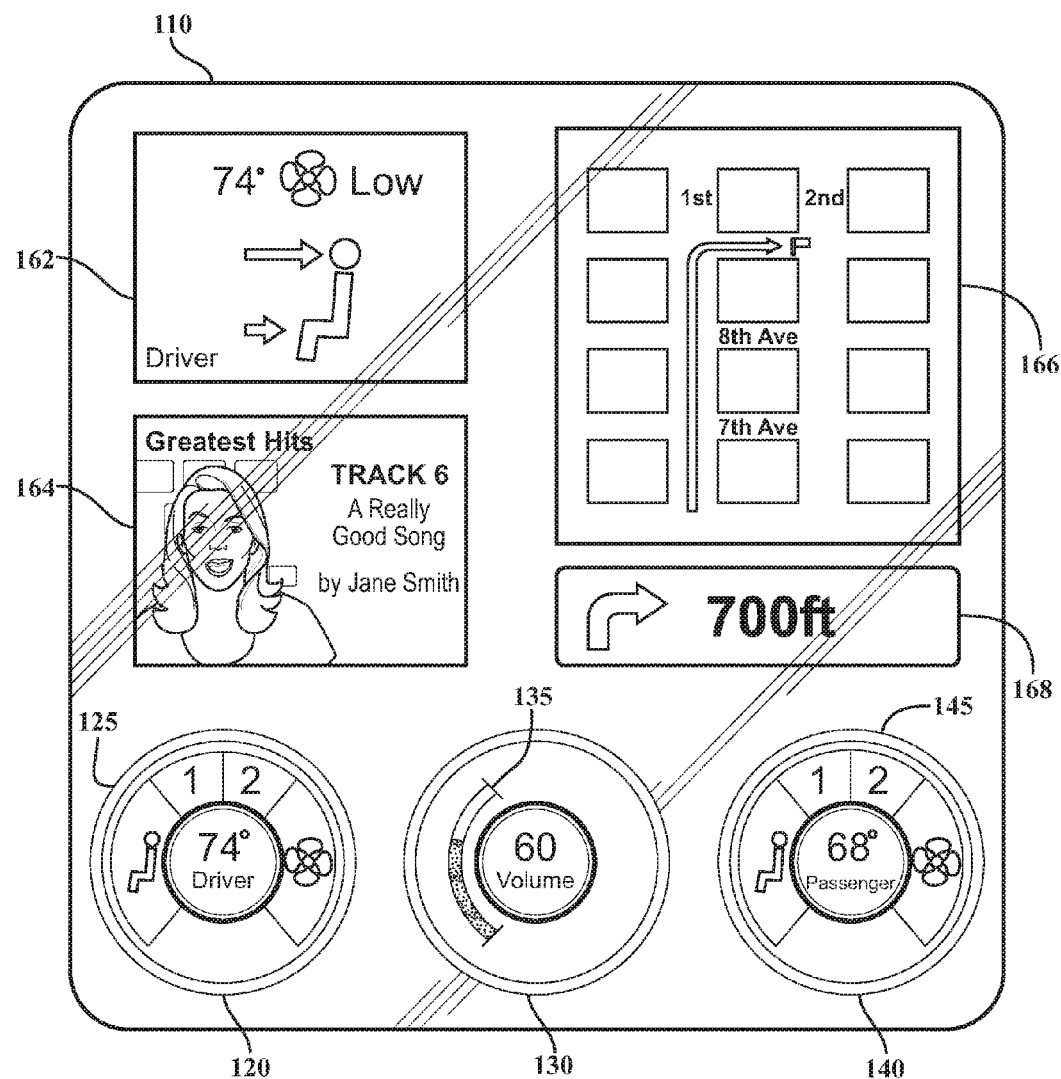
FIG. 2 is a diagram of an embodiment of a contextual knob control system.

FIG. 2 is a diagram of an embodiment of a contextual knob control system. Touch screen interface 110 may be configured to display various information. For example, touch screen interface 110 may display a current status of environmental controls 162, a current status of audio system 164, a map 166, and a navigation guidance 168. In other embodiments, other combinations of information may be displayed on touch screen interface 110.

Left contextual knob 120 may be configured for driver side climate control. The area 125 of touch screen interface 110 around left contextual knob 120 may display information relevant to the system that left contextual knob 120 may be controlling. In this embodiment, area 125 may display indicators relevant to the climate control system of the vehicle. The integrated display of left contextual knob 120 may display information relevant to the driver side climate controls. In this embodiment, the integrated display may display a current temperature of the driver side climate control system.

Center contextual knob 130 may be configured for audio system control. The area 135 of touch screen interface 110 around center contextual knob 130 may display information relevant to the system that center contextual knob 130 may be controlling. In this embodiment, area 135 may display indicators relevant to the audio system of the vehicle. The integrated display of center contextual knob 130 may display information relevant to the audio system controls. In this embodiment, the integrated display may display the volume setting of the audio system.

Right contextual knob 140 may be configured for passenger side climate control. The area 145 of touch screen interface 110 around left contextual knob 140 may display information relevant to the system that left contextual knob 140 may be controlling. In this embodiment, area 145 may display indicators relevant to the climate control system of the vehicle. The integrated display of right contextual knob 140 may display information relevant to the passenger side climate controls. In this embodiment, the integrated display may display a current temperature of the passenger side climate control system.

In some embodiments, the contextual knobs may be configured to control other systems in a vehicle. For example, the contextual knobs may be used to control any combination of communication devices, navigational systems, climate control systems, audio systems, and any other system a user may control. Further, more or less than three contextual knobs may be present in certain embodiments. Still further, the arrangement of the contextual knobs may vary based upon numerous factors. For example, the number of systems to be controlled, costs of the knobs and/or display, and other design considerations.

FIGS. 3A-3H display an embodiment of a sequence of operation for an audio system contextual knob 300. FIG. 3A is a diagram of an embodiment of a contextual knob 300 configured for audio system volume control. The contextual knob 300 may comprise an integrated display 310. Integrated display 310 may be configured to display an indication that the contextual knob 300 is controlling volume. An area 320 around contextual knob 300 may display information 330 relevant to the system that contextual knob 300 is controlling. Unused space 340 may be part of the display that is not used due to line of sight issues or other issues due to the contextual knob 300. In this embodiment, information 330 may be a graphical representation of the volume level of the audio system. A user may turn contextual knob 300 to adjust the volume of the audio system. The adjustment of the volume may be depicted in information 330. In some embodiments, the user may tap and hold the contextual knob 300 to mute or turn off the audio system.

FIG. 3B is a diagram of an embodiment of a contextual knob 300 configured for audio system library browsing control. Library browsing may be selected by accessing a menu, rotating contextual knob 300, speaking a command, or some other action to cause the library browsing control to be displayed. Integrated display 310 may be configured to display an indication that the contextual knob 300 is controlling browsing of a music library. Information 330 may display information related to browsing the music library, for example, genres of music, playlists, favorites, etc. A user may touch the portion of area 320 that indicates rock to retrieve rock music from the library. Other parts of area 320 may be selected to retrieve the information 330 displayed (e.g., other genres).

FIG. 3C is a diagram of an embodiment of a contextual knob 300 configured for audio source control. Source control may be selected by accessing a menu, rotating contextual knob 300, speaking a command, or some other action to cause the source control to be displayed. Integrated display 310 may be configured to display an indication that the contextual knob 300 is controlling audio source selection. Information 330 may display information related to available audio sources, for example, AM, FM, satellite radio, internet based music, attached media player, etc. A user may touch the portion of area 320 that indicates FM to select the FM tuner as the audio source. Other parts of area 320 may be selected to retrieve the information 330 displayed (e.g., other sources). In some embodiments, rotating contextual knob 300 may highlight portions of information 330. The user may select a highlighted portion by depressing contextual knob 300 or touching the highlighted portion of the information 330.

FIG. 3D is a diagram of an embodiment of a contextual knob 300 configured for audio tone control. Audio tone control may be selected by accessing a menu, rotating contextual knob 300, speaking a command, or some other action to cause the tone control to be displayed. Integrated display 310 may be configured to display an indication that the contextual knob 300 is controlling audio tone. Information 330 may display information related to available audio tone controls, for example, bass, treble, fade, etc. A user may touch the portion of area 320 that indicates treble to select the treble adjustment. Other parts of area 320 may be selected to adjust the information 330 displayed (e.g., other tone controls). In some embodiments, rotating contextual knob 300 may highlight portions of information 330. The user may select a highlighted portion by depressing contextual knob 300 or touching the highlighted portion of the information 330.

FIG. 3E is a diagram of an embodiment of a contextual knob 300 configured for audio system control. Audio system control may be selected by accessing a menu, rotating contextual knob 300, speaking a command, or some other action to cause the audio system control to be displayed. In some embodiments, audio system control mat be the default state of contextual knob 300 upon power up. Integrated display 310 may be configured to display an indication of the current volume of the audio system. Information 330 may display information related to selecting audio system features, for example, source selection, media library selection, etc. A user may touch the portion of area 320 that indicates media library selection to enable selection of media from an associated media library. Other parts of area 320 may be selected to control other features of the audio system (e.g., audio sources or audio tone). In some embodiments, rotating contextual knob 300 may adjust the volume of the audio system.

FIG. 3F is a diagram of an embodiment of a contextual knob 300 configured for audio system control. Audio system control may be selected by accessing a menu, rotating contextual knob 300, speaking a command, or some other action to cause the audio system control to be displayed. Integrated display 310 may be configured to display an indication of the current volume of the audio system. Information 330 may display information related to selecting audio system features, for example, source selection, media library selection, etc. Information 330 may also display subcategories of audio system control, for example, playlists, or music categories. A user may touch the portion of area 320 that indicates a playlist to play the playlist. Other parts of area 320 may be selected to control other features of the audio system (e.g., audio sources or audio tone). In some embodiments, rotating contextual knob 300 may adjust the volume of the audio system.

FIG. 3G is a diagram of an embodiment of a contextual knob 300 configured for audio system control. Audio system control may be selected by accessing a menu, rotating contextual knob 300, speaking a command, or some other action to cause the audio system control to be displayed. Integrated display 310 may be configured to display an indication of the current volume of the audio system. Information 330 may display information related to selecting audio system features, for example, source selection, media library selection, etc. A user may select a portion of information 330 that indicates media library, subsequently, information 330 may display, for example, playlists or music categories. A user may touch the portion of area 320 that indicates a desired playlist. Touching the playlist may cause the playlist to be played, or a listing of tracks in the play list to be displayed. Other parts of area 320 may be selected to control other features of the audio system (e.g., audio sources or audio tone). In some embodiments, rotating contextual knob 300 may adjust the volume of the audio system.

FIG. 3H is a diagram of an embodiment of a contextual knob 300 configured for audio system control. Audio system control may be selected by accessing a menu, rotating contextual knob 300, speaking a command, or some other action to cause the audio system control to be displayed. Integrated display 310 may be configured to display an indication of the current volume of the audio system. Information 330 may display information related to selecting audio system features, for example, source selection, media library selection, etc. A user may select a portion of information 330 that indicates source selection, subsequently, information 330 may display various audio sources available to the audio system. A user may touch the portion of area 320 that indicates a desired source. Touching the source may cause the source to be played. Other parts of area 320 may be selected to control other features of the audio system (e.g., media library or audio tone). In some embodiments, rotating contextual knob 300 may adjust the volume of the audio system.

FIG. 4A is a diagram of an embodiment of a contextual knob 400 configured for temperature control. Temperature control may be selected by accessing a menu, rotating or depressing contextual knob 400, speaking a command, or some other action to cause the temperature control to be displayed. In some embodiments, temperature control may be the default setting for contextual knob 400. Integrated display 410 may display a current desired temperature for the temperature control. Information 430 may depict a graphical display of temperature ranging from cold to hot. The display may use a bar or some other indicator and colors such as red or blue to indicate hot or cold respectively. Area 440 may be configured as a no display area. Rotating contextual knob 400 may cause the desired temperature to change. For example, clockwise rotation may cause the desired temperature to increase, and counterclockwise rotation may cause the desired temperature to decrease.

FIG. 4B is a diagram of an embodiment of a contextual knob 400 configured for fan control. Fan control may be selected by accessing a menu, rotating or depressing contextual knob 400, speaking a command, or some other action to cause the fan control to be displayed. In some embodiments, fan control may be the default setting for contextual knob 400. Integrated display 410 may display a current fan speed. Information 430 in area 420 may depict a graphical display of various fan speed increments. In some embodiments, area 420 may be part of touch screen interface 110. The display may use numbers or some other indicator for displaying various fan speeds. Area 440 may be configured as a no display area. Rotating contextual knob 400 may cause the fan speed to change. For example, clockwise rotation may cause the fan speed to increase, and counterclockwise rotation may cause the fan speed to decrease. In some embodiments, a user may touch the desired fan speed. FIG. 4C depicts contextual knob 400 and information 430 after a user has touched a desired fan speed. Fan speed 3 may be highlighted after selection by a user and integrated display 410 may now display the current fan speed of 3.

FIG. 4D is a diagram of an embodiment of a contextual knob 400 configured for zone control. Zone control may be selected by accessing a menu, rotating or depressing contextual knob 400, speaking a command, or some other action to cause the zone control to be displayed. Zone control may allow a user to select where conditioned air may be blown from. In some embodiments, zone control may be the default setting for contextual knob 400. Integrated display 410 may display an indicator of zone control or a currently selected zone. Information 430 may depict a graphical display of various zones. Area 440 may be configured as a no display area. Rotating contextual knob 400 may cause the selected zone to change. In some embodiments, a user may touch the desired zone.

FIG. 4E is a diagram of an embodiment of a contextual knob 400 configured for climate control. Climate control may be selected by accessing a menu, rotating or depressing contextual knob 400, speaking a command, or some other action to cause the zone control to be displayed. In some embodiments, climate control may be the default setting for contextual knob 400. Integrated display 410 may display an indicator of the desired temperature of the climate control. Information 430 may depict a graphical display of various features of the climate control that may be adjusted. For example, zone control and fan control. Area 440 may be configured as a no display area. Rotating contextual knob 400 may cause the desired temperature to change.

FIG. 4F is a diagram of an embodiment of a contextual knob 400 configured for climate control. Climate control may be selected by accessing a menu, rotating or depressing contextual knob 400, speaking a command, or some other action to cause the zone control to be displayed. In some embodiments, climate control may be the default setting for contextual knob 400. Integrated display 410 may display an indicator of the desired temperature of the climate control. Information 430 may depict a graphical display of various features of the climate control that may be adjusted. For example, zone control and fan control. Information 430 may also display subcategories of the various features. For example, fan speeds associated with the fan control. Area 440 may be configured as a no display area. Rotating contextual knob 400 may cause the desired temperature to change.

FIG. 4G is a diagram of an embodiment of a contextual knob 400 configured for climate control. Climate control may be selected by accessing a menu, rotating or depressing contextual knob 400, speaking a command, or some other action to cause the zone control to be displayed. In some embodiments, climate control may be the default setting for contextual knob 400. Integrated display 410 may display an indicator of the desired temperature of the climate control. Information 430 may depict a graphical display of various features of the climate control that may be adjusted. For example, zone control and fan control. Information 430 may also display subcategories of the various features in response to a user touching the area of information 430 that indicates fan control. For example, fan speeds associated with the fan control may be displayed when a user touches the fan control indicator. Area 440 may be configured as a no display area. Rotating contextual knob 400 may cause the desired temperature to change.

FIG. 4H is a diagram of an embodiment of a contextual knob 400 configured for climate control. Climate control may be selected by accessing a menu, rotating or depressing contextual knob 400, speaking a command, or some other action to cause the zone control to be displayed. In some embodiments, climate control may be the default setting for contextual knob 400. Integrated display 410 may display an indicator of the desired temperature of the climate control. Information 430 may depict a graphical display of various features of the climate control that may be adjusted. For example, zone control and fan control. Information 430 may also display subcategories of the various features in response to a user touching the area of information 430 that indicates zone control. For example, zones associated with the zone control may be displayed when a user touches the zone control indicator. Area 440 may be configured as a no display area. Rotating contextual knob 400 may cause the desired temperature to change.

Figure 5:
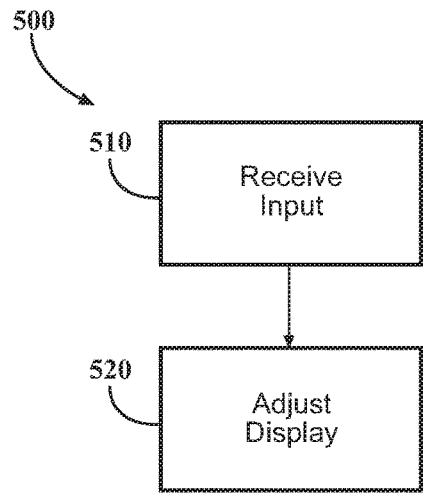
FIG. 5 is a flow diagram of an embodiment of a method for contextual knob operation.

FIG. 5 is a flow diagram of an embodiment of a method 500 for contextual knob operation. The method 500 begins at step 510 when an input is received. The input may be received by a contextual knob, e.g., contextual knob 300 or contextual knob 400, or by a touch screen interface, e.g. touch screen interface 110. The input may be a touch, a press of a contextual knob, or a turn of a contextual knob, or some other input to control a system of the vehicle. The input may be detected by a control module in communication with an input device, e.g., a contextual knob of touch screen display. After receiving an input a display, e.g. touch screen interface 110, and/or integrated display 310 and 410, associated with the contextual knob may be updated at step 520. The portion of the display that is updated may be adjacent to the contextual knob associated with the input.

Figure 6:
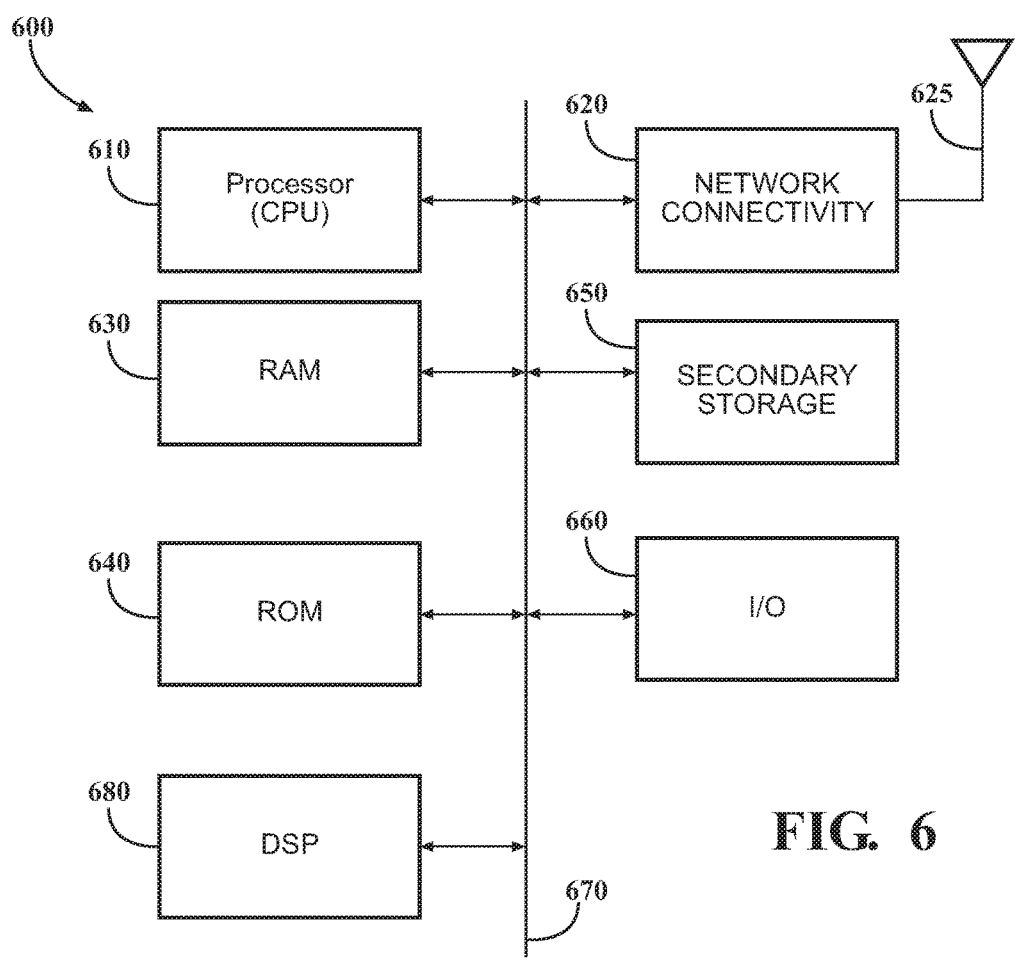
FIG. 6 is a diagram of an embodiment of a system for in-vehicle system control.

FIG. 6 illustrates an example of a system 600 that includes a processor 610 suitable for implementing one or more embodiments disclosed herein. The processor 610 may control the overall operation of the device. In addition to the processor 610 (which may be referred to as a central processor unit or CPU), the system 600 might include network connectivity devices 620, random access memory (RAM) 630, read only memory (ROM) 640, secondary storage 650, and input/output (I/O) devices 660. These components might communicate with one another via a bus 670. In some cases, some of these components may not be present or may be combined in various combinations with one another or with other components not shown. These components might be located in a single physical entity or in more than one physical entity. Any actions described herein as being taken by the processor 610 might be taken by the processor 610 alone or by the processor 610 in conjunction with one or more components shown or not shown in the drawing, such as a digital signal processor (DSP) 680. Although the DSP 680 is shown as a separate component, the DSP 680 might be incorporated into the processor 610. The processor 610 executes instructions, codes, computer programs, or scripts that it might access from the network connectivity devices 620, RAM 630, ROM 640, or secondary storage 650 (which might include various disk-based systems such as hard disk, floppy disk, or optical disk). While only one CPU 610 is shown, multiple processors may be present. Thus, while instructions may be discussed as being executed by a processor, the instructions may be executed simultaneously, serially, or otherwise by one or multiple processors. The processor 610 may be implemented as one or more CPU chips and may be a hardware device capable of executing computer instructions.

The network connectivity devices 620 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 620 may enable the processor 610 to communicate with the Internet or one or more telecommunications networks or other networks from which the processor 610 might receive information or to which the processor 610 might output information. The network connectivity devices 620 might also include one or more transceiver components 625 capable of transmitting and/or receiving data wirelessly.

The RAM 630 might be used to store volatile data and perhaps to store instructions that are executed by the processor 610. The ROM 640 is a non-volatile memory device that typically has a smaller memory capacity than the memory capacity of the secondary storage 650. ROM 640 might be used to store instructions and perhaps data that are read during execution of the instructions. Access to both RAM 630 and ROM 640 is typically faster than to secondary storage 650. The secondary storage 650 is typically comprised of one or more disk drives or tape drives and might be used for non-volatile storage of data or as an over-flow data storage device if RAM 630 is not large enough to hold all working data. Secondary storage 650 may be used to store programs that are loaded into RAM 630 when such programs are selected for execution.

The I/O devices 660 may include liquid crystal displays (LCDs), touch screen displays, knobs, keyboards, keypads, switches, dials, mice, track balls, voice recognizers, card readers, paper tape readers, printers, video monitors, or other well-known input/output devices. Also, the transceiver 625 might be considered to be a component of the I/O devices 660 instead of or in addition to being a component of the network connectivity devices 620.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium.

What is claimed is:

1. A control console comprising:
a contextual knob configured to control multiple settings of a system including a first setting;
a first display integrated in the contextual knob, the first display displaying information relevant to the system;
a second display encompassing the contextual knob, the second display including a portion adjacent to the contextual knob, the portion of the second display displaying information relevant to the first setting of the system currently being controlled by the contextual knob; and
a control module configured to:
detect a first input for switching from the first setting of the system currently being controlled by the contextual knob to a second setting that is different from the first setting;
switch which setting is being controlled by the contextual knob from the first setting to the second setting; and
update the portion of the second display to display information relevant to the second setting responsive to detecting the first input.

2. The control console of claim 1, wherein the control module is further configured to update the first display responsive to detecting the first input.

3. The control console of claim 1, wherein the first input comprises a depression of the contextual knob.

4. The control console of claim 1, wherein the system is a first system, and wherein the control console further comprises:
a second contextual knob configured to control a second system different from the first system.

5. The control console of claim 4, wherein the first system is one of an audio system and a climate system, and wherein the second system is the other one of the audio system and the climate system.

6. The control console of claim 1, wherein the system comprises an audio system, and wherein the information relevant to the first setting comprises information relevant to a current volume setting for the audio system.

7. The control console of claim 6, wherein the second setting is any one of tone, source, and library browsing.

8. The control console of claim 1, wherein the system comprises a climate control system, and wherein the information relevant to the first setting comprises information relevant to a current temperature setting for the climate control system.

9. The control console of claim 8, wherein the second setting is any one of fan control and zone control.

10. A method for console control, the method comprising:
displaying information relevant to a system on a first display integrated in a contextual knob, the system having multiple settings controllable by the contextual knob;
displaying information relevant to a first setting of the system on a portion of a second display encompassing the contextual knob, the portion of the second display adjacent the contextual knob, and the first setting of the system being one of the multiple settings of the system controllable by the contextual knob;
detecting, by a control module, a first input for switching which setting of the system is being controlled by the contextual knob from the first setting to a second setting different from the first setting; and updating the portion of the second display to display different information relevant to the second setting responsive to detecting the first input.

11. The method of claim 10 further comprising;
updating the first display to display different information relevant to the system responsive to detecting the first input.

12. The method of claim 10, wherein the first input comprises a depression of the contextual knob.

13. The method of claim 10, wherein the system is any one of an audio system and a climate system.

14. The method of claim 10, wherein the system comprises an audio system, and wherein the information relevant to the first setting comprises information relevant to a current volume setting for the audio system.

15. The method of claim 14, wherein the second setting is any one of tone, source, and library browsing.

16. A method for console control, the method comprising:
detecting a first input on a contextual knob configured to control multiple settings of a system including a first setting;
displaying changes in the first setting for the system at a portion of a display corresponding to the first input, the portion of the display adjacent to the contextual knob;
detecting a second input on the contextual knob;
switching which setting is currently being controlled by the contextual knob from the first setting to second setting different from the first setting; and
displaying information corresponding to the second setting on the portion of the display responsive to the contextual knob switching to control the second setting.

17. The method of claim 16 further comprising:
displaying, on an integrated display of the contextual knob, an indicator related to the system, the indicator indicating information corresponding to the system.

18. The method of claim 16, wherein the system comprises an audio system.

19. The method of claim 16, wherein the system comprises a climate control system.

20. The method of claim 17, further comprising:
updating the indicator displayed on the integrated display of the contextual knob responsive to detecting the second input.

* * * * *